United States Patent [19]
Furukawa

[11] 3,933,289
[45] Jan. 20, 1976

[54] MAGNETIC RECORDING AND REPRODUCING APPARATUS

[75] Inventor: Mitsuaki Furukawa, Fuchu, Japan

[73] Assignee: New Nippon Electric Co., Ltd., Osaka, Japan

[22] Filed: Oct. 31, 1973

[21] Appl. No.: 411,331

[30] Foreign Application Priority Data
Nov. 7, 1972  Japan.............................. 47-111482
Nov. 13, 1972  Japan............................. 47-113630

[52] U.S. Cl. ............................................. 226/178
[51] Int. Cl.² ........................................ B65H 17/22
[58] Field of Search ......... 226/13, 42, 37, 178, 188; 318/696, 685, 600, 601, 603, 415, 696

[56] References Cited
UNITED STATES PATENTS

| | | |
|---|---|---|
| 3,079,056 | 2/1963 | Groenewegen ..................... 226/178 |
| 3,124,291 | 3/1964 | Beer................................. 226/178 |
| 3,387,758 | 6/1968 | Delaney ......................... 226/176 X |
| 3,466,517 | 9/1969 | Leenhouts ...................... 318/696 X |
| 3,579,279 | 5/1971 | Inaba ................................ 318/696 |
| 3,665,284 | 5/1972 | Loyzim ............................. 318/696 |
| 3,739,969 | 6/1973 | Warren ........................... 226/178 X |

*Primary Examiner*—Richard A. Schacher
*Attorney, Agent, or Firm*—Charles W. Helzer

[57] ABSTRACT

In magnetic recording and reproducing apparatus wherein a magnetic tape is driven at a variable speed by a driving motor through a capstan, a pulse motor is used as the driving motor, the speed thereof being variable by changing the frequency of the pulses applied thereto, and the pulse motor is coupled to the capstan through a resilient belt whereby to transform intermittent rotation of the pulse motor into substantially uniform rotation of the capstan.

8 Claims, 7 Drawing Figures

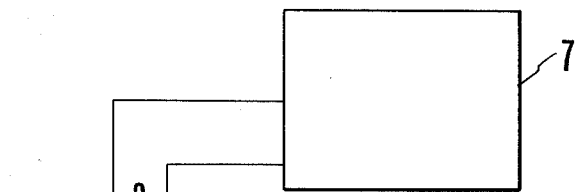
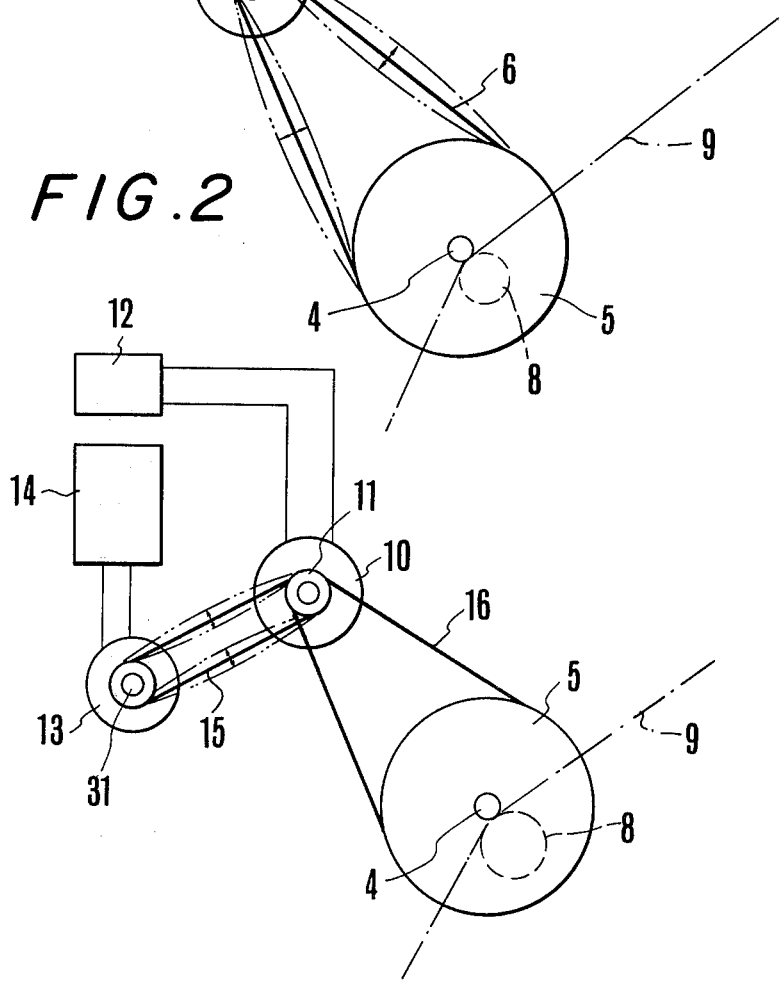

MAGNETIC RECORDING AND REPRODUCING APPARATUS

BACKGROUND OF THE INVENTION

This invention relates to apparatus for driving magnetic recording and reproducing apparatus required to selectively switch the running speed of magnetic recording medium or tape over a wide range, more particularly to apparatus which utilizes an intermittently rotating pulse motor for driving magnetic recording and reproducing apparatus which is required to be operated smoothly at a constant speed over a range covering low speeds that can not be provided by an ordinary induction motor or a synchronous motor and high speeds.

In magnetic recording and reproducing apparatus (for the sake of simplicify, hereinafter merely termed a magnetic recorder) various methods and apparatus have been used to drive the magnetic tape at a stable and constant speed for performing recording and reproduction at high fidelities. Accordingly, the driving motor for driving a capstan that determines the running speed of the tape is required to rotate stably at a constant speed. For this reason, in most cases synchronous motors are preferred rather than induction motors. Where synchronous motors are used, switching of the running speed of the tape is effected by changing the number of poles of the synchronous motor or by using a plurality of intermediate idle rollers which are switched mechanically. However, where it is necessary to switch the running speed of the tape among several different speeds, the number of poles and the number of intermediate idle rollers increase also. For example, where it is necessary to select one of four different speeds, it is necessary to change the number poles among, 2, 4, 8 and 16 poles, thus increasing size of the motor and complicating its connection. In the case of switching among idle rollers of different diameter, the mechanism for sliding and selecting idle rollers becomes complicated. Where these two types of speed switching is used, the weight of the speed changing mechanism increases. In addition, it is necessary to construct the mechanism to be adjustable and it has been difficult to obtain absolutely constant speeds due to the deformation of the idle rollers or the like causes.

Where it is desired to vary the running speed of the tape over a wide range of from an extremely low speed to a high speed, for example 100 mm/sec., an ordinary induction motor or a synchronous motor and a mechanical speed changing mechanism can not meet this requirement. In an example of a video tape recorder which operates the tapes for 1 hour, 6 hours, 12 hours, 24 hours and 48 hours, respectively, it is necessary to change the speed of the tape for respective runs. Such long time video tape recorder is used in combination with a television camera for the supervision over a long period, recording and observation of various human activities. For example, such a system has a wide application in the long time supervision of the safeness of banks or the like place, for continuous supervision of nuclear reactors to which access of the operators is dangerous, for observation of the condition of department stores or stations where many persons gather together or an analysis of the styles or physical reactions of sportmen. Such a video tape recorder usually uses a video tape of the ¾ inch cassette type, and in addition to a 48 minutes recording, by operating a transfer switch it is also possible to record for 6, 12, 24 or 48 hours.

In such a long time video tape recorder, the running speed of the tape is the highest for the one hour mode but decreases for operating modes over longer time periods. For this reason, taking the one hour mode as the standard operation, if the recording is made for 6 hours and the reproduction is made for 12 hours, a slow motion picture would result. On the other hand, an extremely slow motion, such as the procedure of the blooming of a flower, is recorded for 48 hours and the recorded film is reproduced by the one hour mode. Then the procedure of the blooming can be reproduced as a continuous motion. In such a case, it is often desired to stop the tape to reproduce a standstill picture. As has been described hereinabove, the running speed of the tape of such a video tape recorder is required to vary between the shortest time mode and the longest time mode, the ratio being 1:48 for example. For example, the minimum running speed of the tape for the one hour mode operation is about 118.8 mm/sec., whereas those for the 6, 12, 24 and 48 hour mode operations are about 14.8, 7.4, 3.7 and 1.8 mm/sec., respectively.

SUMMARY OF THE INVENTION

It is an object of this invention to provide improved magnetic recording and reproducing apparatus capable of varying the running speed of a magnetic recording tape over a wide range including extremely low speed without using a pole change motor or a mechanical speed change mechanism.

Another object of this invention is to provide an improved magnetic recording and reproducing apparatus especially suitable for use in combination with a video tape recorder.

According to this invention these and further objects can be accomplished by providing magnetic recording and reproducing apparatus of the class comprising a driving motor, and a capstan driven by the driving motor for driving a magnetic tape and wherein the speed of the tape is varied over a wide range, characterized in that the driving motor comprises a pulse motor, that control means is provided for varying the frequency of the pulses applied to the pulse motor, and that resilient means is used to couple together the pulse motor and the capstan whereby to transform intermittent rotation of the pulse motor into substantially uniform rotation of the capstan.

In order to widen the range of speed variation of the magnetic tape, according to modified embodiments of the invention, there is provided a synchronous motor rotating at a higher speed than the pulse motor. The synchronous motor may be interposed between the pulse motor and the capstan, or disposed to drive the capstan through the pulse motor, or disposed to drive the capstan independently of the pulse motor. Where the pulse motor and the synchronous motor are provided care should be taken not to energize them simultaneously.

BRIEF DESCRIPTION OF THE DRAWINGS

Other objects and advantages of the invention will be better understood from the following detailed description taken in conjunction with the accompanying drawings in which:

FIG. 1 is a diagrammatic representation of one embodiment of this invention;

FIGS. 2, 3 and 4 show modified embodiments of this invention.

DESCRIPTION OF THE PREFERRED EMBODIMENTS

Figure 3:
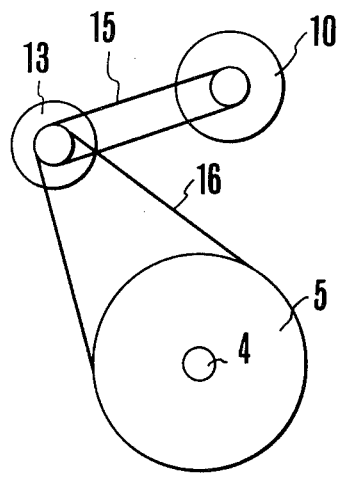

A preferred embodiment of this invention shown in FIG. 1 of the accompanying drawings comprises a pulse actuated stepping motor 1 (hereinafter referred to as a pulse motor) having a shaft 3 and a pulley 2 mounted thereon, a capstan 4 and a flywheel 5. According to this invention, a resilient belt 6, made of rubber for example, is used to couple together the pulley 2 and the flywheel 5. Where a pulse motor which rotates 1.8° per step is used, one complete revolution can be realized with 200 pulses. The number of the pulses applied to the pulse motor 1 is controlled by a speed regulator 7 or a source of pulses of a variable frequency. The source of pulses 7 may comprise a well known pulse generator and a pulse control circuit, not shown in detail. As the pulses are applied to the pulse motor 1 it rotates intermittently at a rate of 1.8° per pulse. Such intermittent rotational steps are transmitted to the flywheel 5 through the resilient belt 6 and are converted into smooth rotations of the flywheel 5 because the belt absorbs intermittent motion by vibrating as shown by dotted lines.

Theoretically, torque is applied to the belt only when the pulses are applied to the pulse motor, so that the speed of the belt decreases between the pulses. However, due to the inertia of the moving parts and the vibratory motion of the resilient belt, the fluctuation in the periphery speed of the flywheel 5 can be minimized.

One method of measuring the speed fluctuation is as follows. A suitable device for detecting the speed fluctuation, for example a magnetic scale, is mounted on a rotary shaft to measure the interval between pulses which are generated in accordance with the rotation of the shaft. The difference between the maximum and minimum intervals of the pulses represents the speed fluctuation, the minimum difference corresponding to the minimum speed fluctuation. The magnetic scale is constructed to generate 300 pulses per one revolution of the shaft and is provided with 300 detecting elements which are arranged on a circle at a spacing of 1.2°.

Figure 5A:
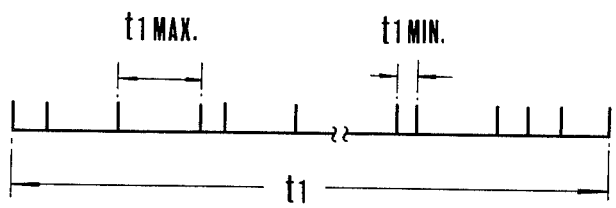
FIGS. 5A and 5B are diagrams to explain the manner of obtaining a constant speed with a pulse motor.

FIG. 5A is a diagram showing the relationship between the pulses generated by the magnetic scale mounted on the rotor of the pulse motor and the rotation of the pulse motor, in which $t_1$ represents the period of one complete revolution of the pulse motor. The intervals between the pulses are not uniform indicating the speed fluctuation. The maximum and minimum intervals are denoted by $t_{1MAX}$ and $t_{1MIN}$ respectively, and the interval when the speed is uniform is denoted by $t_{1NOM} = t_1/300$, then, the speed regulation can be expressed by the following equation $$\text{Speed regulation} = \frac{t_{1MAX} - t_{1MIN}}{t_{1NOM}} \times 100\%.$$

Figure 5B:
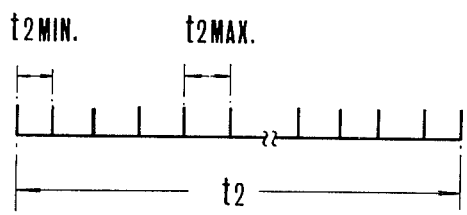

FIG. 5B shows the pulses generated by a magnetic scale which is mounted on the shaft of pulley 5 driven by the pulse motor through a rubber belt. As can be noted from FIG. 5B, the difference between the maximum interval $t_{2MAX}$ and the minimum interval $t_{2MIN}$ is greatly decreased with respect to the case shown in FIG. 5A, meaning that the speed of the flywheel and hence the running speed of the tape are substantially uniform. The speed regulation of the case shown in FIG. 5B is expressed by $$\frac{t_{2MAX} - t_{2MIN}}{t_{2NOM}} \times 100\%$$

where $t_{2NOM} = t_2/300$.

By comparing the speed regulations of both cases, it can be noted that use of a resilient belt converts the intermittent rotations of the pulse motor into a substantially uniform speed of the rotation of the flywheel.

Figure 6:
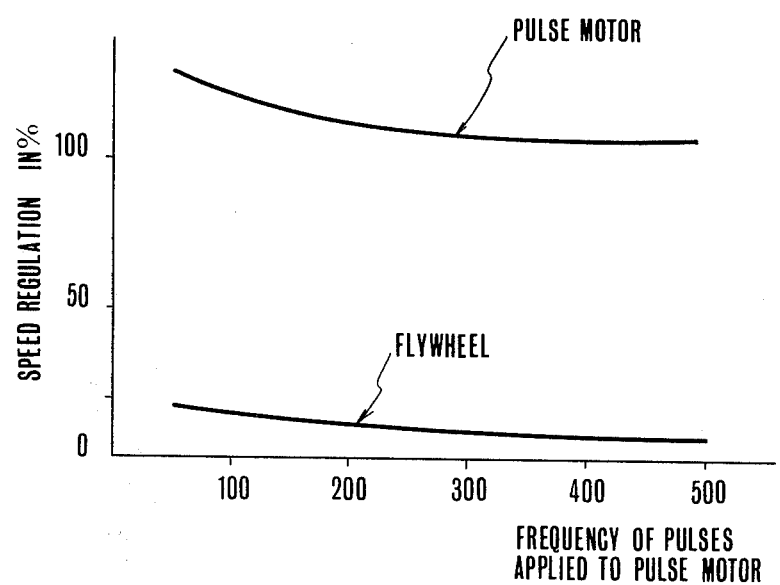
FIG. 6 shows the speed regulations of the pulse motor and a pulley driven thereby through a resilient belt.

Since the pulse motor rotates over a predetermined angle in response to each applied pulse, it is possible to modify the movement of its rotor by varying the number of pulses applied to the pulse motor in a given period. Generally speaking, the larger the number of applied pulses in a given unit of time, the higher is the speed of the rotation of the rotor. For this reason, it is necessary to measure the speed regulation when the interval $t_1$ is varied in four steps, for example, by varying the frequency of the pulses impressed upon the pulse motor. As can be readily noted from the foregoing description, the interval $t_2$ varies automatically with interval $t_1$. FIG. 6 shows the result of such measurement. As can be noted from FIG. 6, the speed regulation of the pulse motor amounts to more than 100% at low frequencies whereas that of the flywheel is improved to be less than 20%. Of course, when the rotor of the pulse motor rotates at a uniform speed, the speed regulation reduces to zero %.

The resilient belt 6 may be a conventional rubber belt, and it was found that a flat rubber belt is especially suitable. Thus, the rotary movement transmitted to the flywheel 5 is transmitted to capstan 4 integral therewith for running at a substantially constant speed the tape 9 which is clamped between capstan 4 and a punch roller 8.

With the arrangement described above, it is possible to drive the tape at any one of many different speeds by merely varying the frequency of the pulses applied to the pulse motor.

In a modification of this invention illustrated in FIG. 2, there is provided a high speed synchronous motor 10 which drives the tape 9 at the highest speed through a resilient belt 16, pulley 11, flywheel 5, capstan 4 and pintch roller 8, the highest speed corresponding to the one hour mode operation of the video tape recorder described above. The energization of the synchronous motor 10 is controlled by a controller 12. There is also provided a low speed pulse motor 13, the speed thereof being varied from an extremely low speed to higher speeds by varying the frequency applied thereto from a source of pulse 14, thus running tape 9 at various speeds. For example, in the video tape recorder of the type described, the running speed for the 12 hour mode is reduced to one half of the speed for the 6 hour mode and the running speeds for the 24 and 48 hour modes are reduced to ¼ and ⅛, respectively of the speed for 6 hour mode. Pulleys 11 and 31 secured to the shafts of motors 10 and 13, respectively, are coupled together by means of a resilient belt 15.

In operation, when the high speed synchronous motor 10 is energized by controller 12, the low speed pulse motor 13 is not energized from the source of pulse 14 so that the rotation of the synchronous motor 10 is transmitted to capstan 4 integral with flywheel 5 through resilient belt 16 and to low speed torque motor 13 through resilient belt 15. Thus, the magnetic tape 9 is driven by the synchronous motor at a high speed. When the low speed pulse motor 13 is operated by the pulse from the source of pulse 14 while the synchronous motor 10 is deenergized, the rotation of the pulse motor which is determined by the frequency of the pulses is transmitted to the tape 9 through resilient belts 15 and 16 and flywheel 5. Under these conditions the resilient belt 15 between the synchronous motor and the pulse motor vibrates as shown by the dotted lines to transform the intermittent rotation of the pulse motor into a smooth continuous rotation, in a manner described hereinabove.

Figure 4:
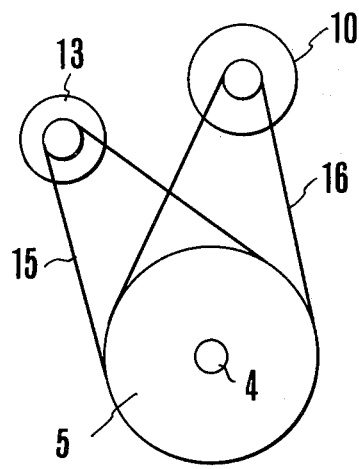

In a modification shown in FIG. 3, the resilient belt 16 is provided between the low speed pulse motor 13 and the flywheel 5 whereas in another modification shown in FIG. 4, the high speed synchronous motor 10 and the low speed pulse motor 13 are coupled to the flywheel 5 through independent belts 16 and 15, respectively. While the embodiments shown in FIGS. 2 to 4 are equally effective, the arrangement of FIG. 2 wherein the torque of the low speed pulse motor is transmitted to the flywheel can obtain more uniform speed of the tape. However, it should be understood that, in any case, both motors 10 and 13 should not be energized simultaneously in order to prevent one motor from becoming the load of the other. Advantageously, the pulse motor should not be provided with permanent magnets positioned between the poles thereof for the purpose of decreasing load on the high speed synchronous motor.

Although the invention has been shown and described in terms of some preferred embodiments thereof it should be understood that many changes and modifications will be obvious to one skilled in the art without departing from the true spirit and scope of the invention as defined in the appended claims.

What is claimed is:

1. In magnetic recording and reproducing apparatus of the class comprising a driving motor, and a capstan driven by said driving motor for driving a record/read out tape and wherein the speed of said tape is varied over a wide range including very low speeds of the order of 1.8 millimeters per second, the improvement wherein said driving motor comprises a pulse actuated stepping motor having a drive shaft, variable frequency pulse control means coupled to and exciting said pulse actuated stepping motor for varying the frequency of the excitation pulses applied to said pulse actuated stepping motor to thereby vary the speed at which the tape is driven, and resilient belt coupling means coupling said stepping motor to said capstan for transforming intermittent rotation of said stepping motor drive shaft into substantially uniform rotation of said capstan.

2. The recording and reproducing apparatus according to claim 1 wherein said resilient belt coupling means comprises a flat rubber resilient belt intercoupling a drive pulley secured to the drive shaft of said stepping motor and a driven flywheel pulley driving said capstan.

3. The recording and reproducing apparatus according to claim 1 which further comprises an additional synchronous motor having a drive shaft and interposed between said stepping motor and said capstan, said synchronous motor being designed for higher rotational speeds than said stepping motor, and said resilient belt coupling means includes a first resilient belt extending between a drive pulley secured to the drive shaft of said stepping motor and a driven pulley secured to the drive shaft of said synchronous motor, and a second resilient belt extending between a drive pulley secured to the drive shaft of said synchronous motor and a driven flywheel pulley driving said capstan.

4. The recording and reproducing apparatus according to claim 1 which further comprises an additional synchronous motor having a drive shaft and designed for rotation at higher speeds than said stepping motor, and said resilient belt coupling means comprises a first resilient belt extending between a drive pulley secured to the drive shaft of said stepping motor and a driven flywheel pulley driving said capstan, and a second resilient belt extending between a driven pulley secured to the drive shaft of said stepping motor and a drive pulley secured to the drive shaft of said synchronous motor.

5. The recording and reproducing apparatus according to claim 1 which further comprises an additional synchronous motor having a drive shaft and designed for rotation at higher speeds than said stepping motor and said resilient belt coupling means comprises a first resilient belt extending between a drive pulley secured to the drive shaft of said stepping motor and a driven flywheel pulley driving said capstan, and a second resilient belt extending between a drive pulley secured to the drive shaft of said synchronous motor and a driven flywheel pulley driving said capstan.

6. The recording and reproducing apparatus according to claim 3 wherein said synchronous motor is deenergized while said stepping motor is operating and said stepping motor is deenergized while said synchronous motor is operating.

7. The recording and reproducing apparatus according to claim 4 wherein said synchronous motor is deenergized while said stepping motor is operating and said stepping motor is deenergized while said synchronous motor is operating.

8. The recording and reproducing apparatus according to claim 5 wherein said synchronous motor is deenergized while said stepping motor is operating and said stepping motor is deenergized while said synchronous motor is operating.

* * * * *